United States Patent
Soundararajan

(10) Patent No.: US 7,345,628 B2
(45) Date of Patent: Mar. 18, 2008

(54) LOCATION DEPENDENT DISPLAY OF INFORMATION FOR GPS DEVICES

(75) Inventor: Aravind Soundararajan, Chennai (IN)

(73) Assignee: Koninklijke Philips Electronics N.V., Eindhoven (NL)

( * ) Notice: Subject to any disclaimer, the term of this patent is extended or adjusted under 35 U.S.C. 154(b) by 251 days.

(21) Appl. No.: 10/538,606

(22) PCT Filed: Dec. 12, 2003

(86) PCT No.: PCT/IB03/05916

§ 371 (c)(1),
(2), (4) Date: Jun. 10, 2005

(87) PCT Pub. No.: WO2004/055542

PCT Pub. Date: Jul. 1, 2004

(65) Prior Publication Data

US 2006/0116819 A1    Jun. 1, 2006

Related U.S. Application Data

(60) Provisional application No. 60/433,743, filed on Dec. 16, 2002.

(51) Int. Cl.
*G01S 1/02* (2006.01)
*G01C 21/00* (2006.01)

(52) U.S. Cl. .................. 342/357.09; 342/357.06; 342/357.13; 701/208; 701/213

(58) Field of Classification Search .......... 342/357.06, 342/357.08, 357.09, 357.12, 357.13; 701/35, 701/208, 213, 215

See application file for complete search history.

(56) References Cited

U.S. PATENT DOCUMENTS

| 6,289,041 B1 | 9/2001 | Krasner |
| 2002/0060747 A1 | 5/2002 | Nonomura |
| 2002/0091568 A1 | 7/2002 | Kraft |
| 2002/0119752 A1 | 8/2002 | Bates |

FOREIGN PATENT DOCUMENTS

| GB | 2 368 990 A | 5/2002 |
| WO | WO 01/52569 A1 | 7/2001 |
| WO | WO 02/41028 A2 | 5/2002 |

OTHER PUBLICATIONS

"Galileo: Satellite System Design and Technology Developments", by J. Benedicto et al., ESA, Nov. 2000.
"GPSMAP 76 Owner's Manual and Reference Guide", Garmin Corp.

*Primary Examiner*—Dao Phan
(74) *Attorney, Agent, or Firm*—Paul Im

(57) ABSTRACT

An invention for providing information to a GPS device by selecting location-specific information stored on a memory medium incorporated in the GPS device, or received by the GPS device from location-specific information broadcast by GPS satellites. The stored or broadcast location-specific information includes a GPS-advice type and a GPS-advice range. The CPU of the GPS device compares a computed or user-input GPS device location with the GPS-advice range included in the stored or broad-cast location-specific information, and outputs the location-specific information to the GPS device if the GPS device location falls within the GPS-advice range included in the stored or broadcast location-specific information or advertising. The stored or broad-cast location-specific information may also be searched and output by user input of any location or GPS-advice type. The stored or transmitted information may be advertising.

16 Claims, 2 Drawing Sheets

LOCATION DEPENDENT DISPLAY OF INFORMATION FOR GPS DEVICES

CROSS REFERENCE TO RELATED APPLICATION

Figure 1:
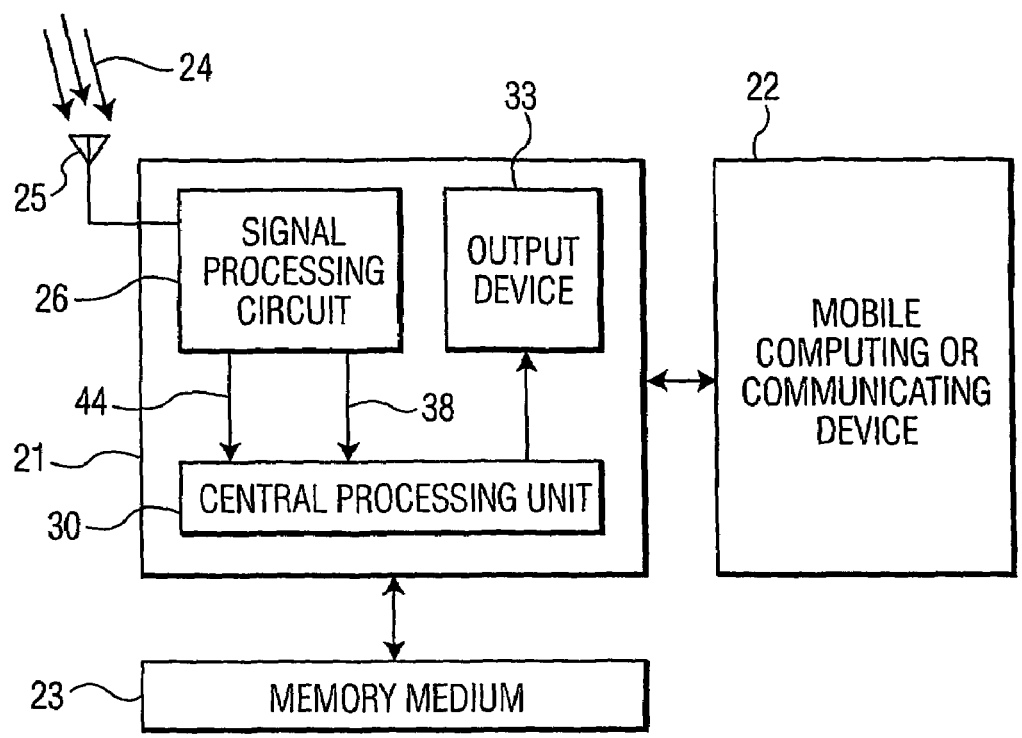

This application claims the benefit of U.S. provisional application Ser. No. 60/433,743 filed Dec. 16, 2002, which is incorporated herein by reference. This invention relates to global positioning system ("GPS") technology and to a device, a system, and methods for providing information to GPS devices and their users.

This invention relates to global positioning system ("GPS") technology and to a device, a system, and methods for providing information to GPS devices and their users.

The conventional advertising paradigm of mass communicating a message using media such as magazines, radio or television broadcasts, is changing to a paradigm of directed advertising to selected groups of consumers, and even individual consumers. Global positioning GPS technologies are being used to deliver advertising to GPS receivers. The delivery of such advertising is also dependent upon technologies such as wireless access to networks or commercial radio or television broadcasts, that interface with, but are operationally distinct from the system of orbiting GPS satellites and terrestrial GPS receivers.

The invention is an apparatus and a method, and a system and a method, for providing information to a GPS device.

A first embodiment of the invention comprises a memory medium on which there is stored a plurality of GPS-advice data sets, each comprising a GPS-advice type, a GPS-advice range, and GPS-advice. The memory medium is operatively connected to a central processing unit ("CPU") and an output device of the GPS device. The CPU compares a current computed, or user-input, GPS device location with the GPS-advice range included in each GPS-advice data set, and selects GPS-advice data set for output to the output device if the GPS device location falls within the GPS-advice range included in the GPS-advice data set. The CPU also compares a user-input GPS-advice type with the GPS-advice type included in each GPS-advice data set, and selects a GPS-advice data set for output to the output device whenever the GPS device location matches the GPS-advice type included in the GPS-advice data set A second embodiment of the invention comprises the system of GPS satellites, with each GPS satellite having an allocation of memory storing GPS-advice data sets that include a GPS-advice type, a GPS-advice range, and GPS-advice. Each GPS satellite broadcasts GPS-advice data sets to a GPS device having a CPU and an output device. The CPU of the GPS device compares a computed or user-input GPS device location with the GPS-advice range included in the broadcast and received GPS-advice data sets received by the GPS device, and selects a broadcast GPS-advice data set for output to the output device if the GPS device location falls within the GPS-advice range included in the broadcast GPS-advice data set. The CPU also compares a user-input GPS-advice type with the GPS-advice type included in the broadcast and received GPS-advice data set, and selects the broadcast GPS-advice data set for output to the output device if the user-input GPS device type matches the GPS-advice type included in the broadcast and received GPS-advice data set In either of the foregoing embodiments, a user of a GPS device may query either the memory medium, or the currently received GPS-advice data sets broadcast by GPS satellites, for GPS-advice identified by GPS-advice types for travel-related goods and services such as, for example, lodging, fuel, food, vehicle repair and maintenance, parking, and the like.

The invention provides the advantage of outputting location-specific information and advertising to a GPS device, either by incorporating the location-specific information and advertising within the hardware of the GPS device proper, or by "piggy-backing" location-specific information and advertising onto the L1 signals continuously broadcast by GPS satellites to GPS receivers. Accordingly, the invention provides location-specific information and advertising that is not dependent on equipping a GPS device with wireless networking access or access to commercial radio or television broadcasts. Moreover, the invention provides a backup source of location-specific information and advertising for the user of a GPS device in those cases where a user of a GPS device experiences problems with wireless access to information.

Figure 2:
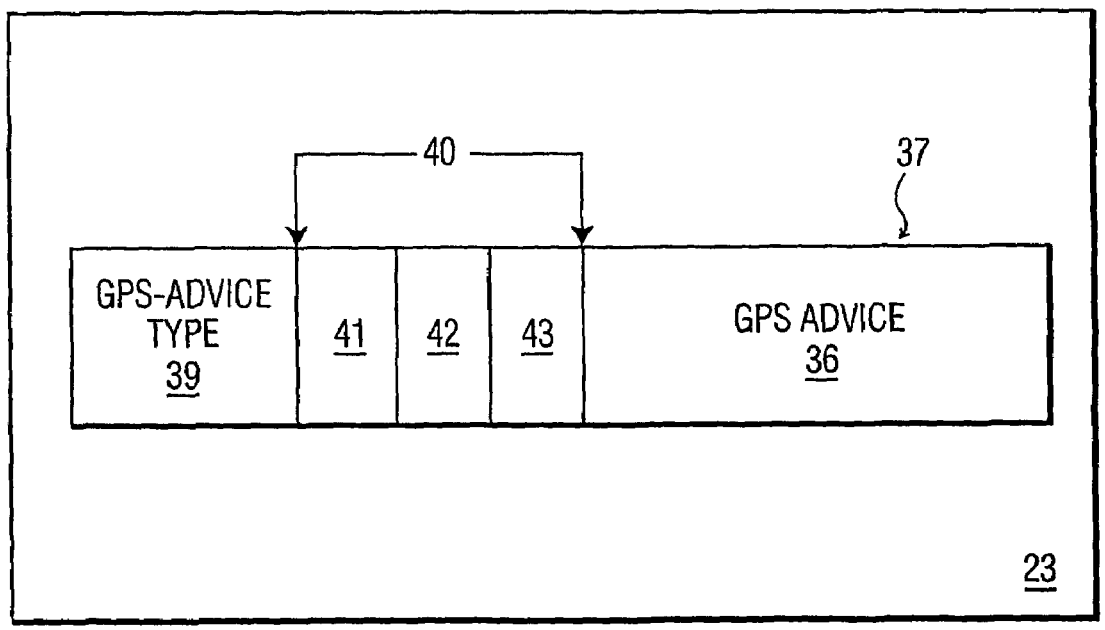
Figure 3:
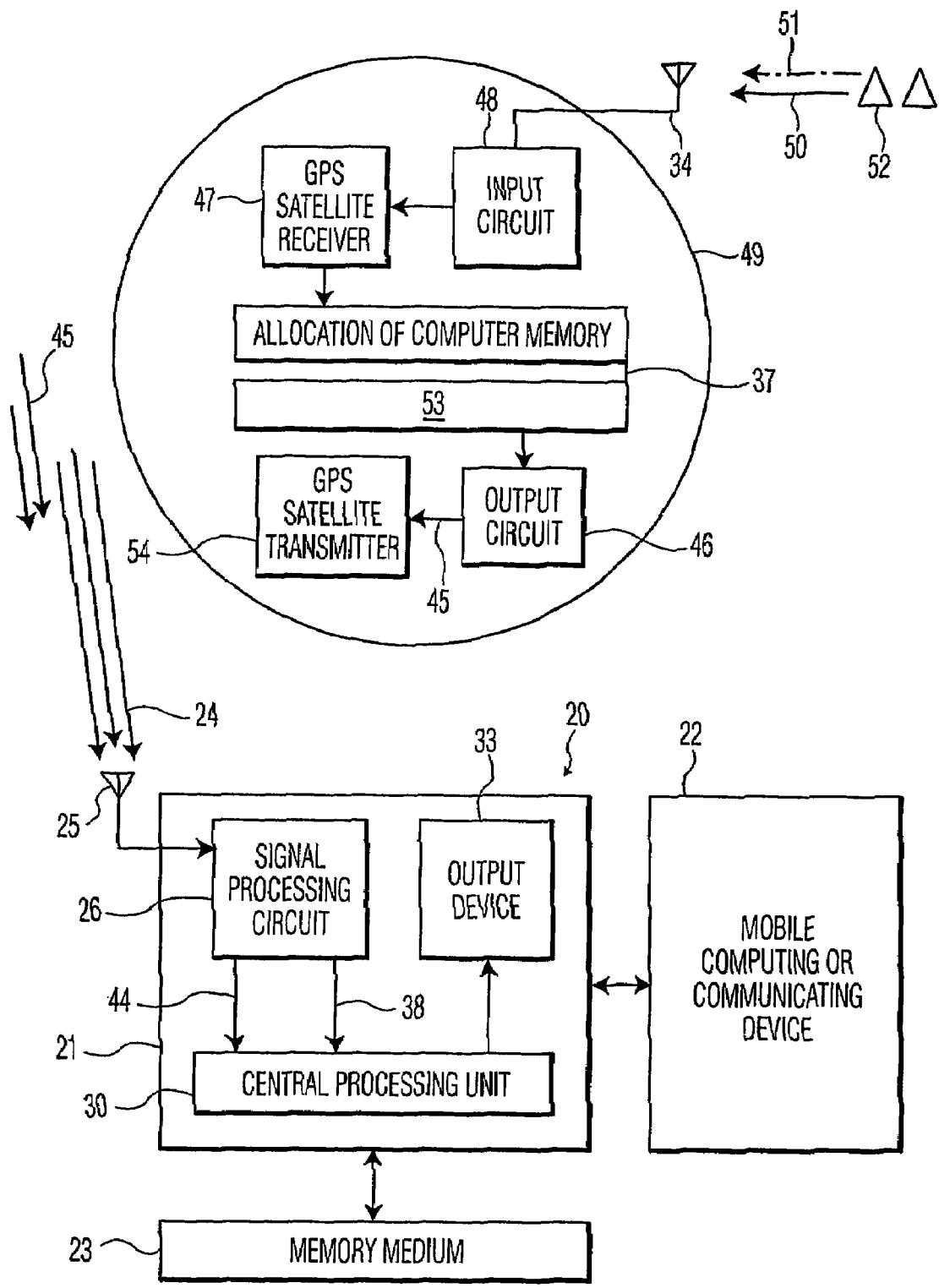

For a better understanding of the invention, reference may be had to the accompanying drawings in which, FIG. 1 is a block diagrammatic representation of a GPS device operationally connected to a memory medium;

FIG. 2 is a schematic representation of a GPS-advice data set and a plurality of GPS-advice data sets stored in a memory medium; and, FIG. 3 is a diagrammatic representation of a GPS satellite-based system for providing GPS-advice data set to a GPS device.

The invention comprises a novel device, system and methods for providing location-specific information and advertising that is relevant to the location of a GPS device or the location-specific needs of its user, without equipping a GPS device with wireless access to communications networks containing information or advertising databases, and without equipping a GPS device for the reception of commercial radio or television broadcasts.

The Global Positioning System ("GPS") is the satellite-based navigation system of satellites placed into orbit by the U.S. Department of Defense, which satellites transmit so-called "L1" signals receivable by a civilian GPS receiver for use in computing the location of the GPS receiver.

As used herein, a GPS device is a GPS receiver, or any GPS-enabled mobile computing or communications device, such as, for example, a personal digital assistant ("PDA"), a hand-held, wrist-worn, or garment-borne communications or computing device, a laptop or notebook computer, a pager, or a cellular telephone, or any combination thereof, operationally connected to a GPS receiver.

The GPS device receives L1 signals broadcast by GPS satellites and extracts data from the L1 signals for use by a programmable central processing unit ("CPU") operatively connected to the GPS device, to compute a GPS device location, that is, the longitude, latitude and altitude of the GPS device. The GPS device location typically appears on an output device operationally connected to the GPS device, such as, for example, a liquid crystal display, or any other device for the display, presentation, manifestation or output of audiovisual, graphical or textual information from the CPU of the GPS device.

The present invention provides location-specific information or advertising, having relevance to the location of the GPS device or the location-specific needs of its user, by outputting location-specific information and advertising to the output device of the GPS device.

As used herein, the term "GPS-advice" means audiovisual, graphical or textual location-specific information, assembled, collected, gathered, grouped, connected, linked or organized as a set of data that is identified by an "GPS-advice type" and a "GPS-advice range" that also included in the data set (hereinafter "GPS-advice data set")

As used herein, the "GPS-advice type" identifies a GPS-advice data set as a category, classification, type or kind of location-specific information or advertising, such as, for example, in the case of travel-related information, lodging, food, fuel, entertainment, parking, docking, maintenance, repair, and the like.

As used herein, the "GPS-advice range" identifies a GPS-advice data set by a set of predetermined ranges of longitude, latitude, and altitude. The GPS-advice range may, for example, comprise a set of predetermined ranges of latitude, longitude, and altitude, respectively encompassing a predetermined fixed longitude, latitude and altitude, where the fixed latitude, longitude and altitude correspond, for example to the center of a city, the peak of a mountain, or the terminus of a peninsula The GPS-advice data set may be acquired from either a memory medium operationally connected to the GPS device, or received by the GPS device from a dedicated carrier signal broadcast by a GPS satellites together with L1 signals.

The memory medium may be physical data storage in the form of one or more hardware memory devices such as, for example, read-only memory ("ROM"), programmable read-only memory ("PROM"), erasable programmable read-only memory (EPROM), electrically erasable programmable read-only memory ("EEPROM"), or flash memory ("flash EEPROM").

In a first embodiment of the invention, GPS advice, such as a listing of addresses, directions to addresses, telephone numbers and room rates for member-motels of a motel chain, or listings of addressees, directions to addresses, telephone numbers and menu offerings of member-restaurants of a fast-food chain may, for example, be stored as GPS-advice data sets in a ROM chip that is built into the GPS device in the course of its manufacture.

The CPU of the GPS device may, for example, be programmed to access and output those motels or restaurants included in GPS-advice data sets having a GPS-advice range that encompasses a GPS location computed by the CPU for the GPS device, may be programmed to access and output those motels or restaurants included in GPS-advice data sets having a GPS-advice range that encompasses any GPS location input by a user of the GPS device.

This embodiment of the invention has the advantage of providing a source of location-specific advertising information that is not dependent on equipping a GPS device with wireless networking access, or access to commercial radio or television broadcasts.

In a second embodiment of the invention, GPS advice, such as a world-wide listing of addresses and telephone numbers of, for example, Western Union™ or American Express™ Offices, or of Christian Science Reading Rooms™ or CitiBank™ ATMs, may be stored as GPS-advice data sets within an allocation of memory aboard any GPS satellite. These GPS-advice data sets may, for example, be modulated within the GPS satellite on a dedicated carrier signal that is multiplexed with the GPS satellite's standard L1 signals for continuous orbital broadcasting.

Such GPS-advice data sets may be received and demodulated by a properly configured GPS device, and output to a user only if the current computed location of the GPS-device falls within the GPS-advice ranges included in the GPS-advice data sets broadcast by GPS satellites and received by the GPS device.

This embodiment of the invention also has the advantage of providing a source of location-specific information that is neither dependent on equipping a GPS device with wireless networking access nor commercial radio and television broadcast access. Rather, the location-specific information and advertising is made available to users of the most rudimentary GPS devices that rely exclusively GPS technology for their support.

Depending on the embodiment of the invention, the CPU of the GPS device either compares the computed or user-input GPS device location with the GPS-advice range included in each GPS-advice data set stored on the memory medium; or, compares the computed or user-input GPS device location with the GPS-advice range included in the GPS-advice data sets broadcast by GPS satellites and received by the GPS device.

If the computed or user-input GPS device location falls within the GPS-advice range included in either a stored or broadcast and received GPS-advice data set, the GPS-advice data set is selected for output to the output device of the GPS device.

The location of a GPS device "falls within" a GPS-advice range if the computed or user-input longitude of a GPS device falls about within the predetermined range of longitude of GPS-advice data set; and, the computed or user-input latitude of a GPS device falls about within the predetermined range of latitude of GPS-advice data set; and, the computed or user-input altitude of a GPS device falls about within the predetermined range of altitude of GPS-advice data set.

Conversely, The location of a GPS device does not fall within a GPS-advice data set range if the computed or user-input longitude of a GPS device does not fall about within the predetermined range of longitude of GPS-advice data set; and, the computed or user-input latitude of a GPS device does not fall about within the predetermined range of latitude of GPS-advice data set; and, the computed or user-input altitude of a GPS device does not fall about within the predetermined range of altitude of GPS-advice data set.

The CPU of the GPS device may also compare a user-input GPS-advice type with the GPS-advice type included in either stored or broadcast and received GPS-advice data sets. If the user-input GPS-advice type matches that of any GPS-advice data set, the GPS-advice data set is selected for output to the output device of the GPS device.

In either of the foregoing embodiments, a user of a GPS device may query either the stored or broadcast and received GPS-advice data sets, for the presence of a GPS-advice type identifying travel-related goods and services such as, for example, lodging, fuel, food, vehicle repair and maintenance, parking, and the like.

Referring now to the drawings in which like parts are designated by like numerals in the various views, in FIG. 1 there is schematically shown, in the form of a block diagram, a first embodiment of the invention, comprising GPS device 20, in which GPS receiver 21, including GPS antenna 25, signal-processing circuit 26, CPU ("CPU") 30, and output device 33, is operatively connected both to mobile communications or computing device 22 and memory medium 23.

L1 GPS signals 24 are received by GPS antenna 25 and input to GPS receiver 21 through signal-processing circuit 26, which acquires, identifies, segregates, demodulates and extracts GPS positional data 38 from L1 GPS signals 24 for input to GPS central processing unit ("CPU") 30. CPU 30 utilizes extracted GPS positional data 38 for computation of a set of positional coordinates comprising the GPS device location. CPU 30 outputs GPS device location to output device 33.

FIG. 2 shows, for purposes of schematic illustration only, a representative GPS-advice data set 37 containing audio-visual, graphical or textual location-specific information or advertising content 36, a GPS-advice type 39, and a GPS-advice range 40, which GPS-advice range comprises a predetermined range of latitude 41, a predetermined range of longitude 42, and a predetermined range of altitude 43.

The division of GPS-advice data set 37 into compartments, regions or subdivisions, as shown in FIG. 2, is intended merely to identify and distinguish the data of which it is comprised. The division of GPS-advice data set 37 into compartments, regions or subdivisions, as shown in FIG. 2, is not intended to segregate, allocate, place or relate location-specific information or advertising 36, GPS-advice type 39, GPS-advice range 40, and ranges of latitude 41, longitude 42, and altitude 43, in any way.

Memory medium 23 stores a plurality of the exemplary GPS-advice data sets 37, including differing location-specific information or advertising 36, GPS-advice types 39, and GPS-advice ranges 40.

CPU 30 is programmed to compare the GPS device location it has computed for
GPS device 20 from extracted GPS positional data 38 with the GPS-advice range 40 contained in each of the GPS-advice data sets 35 stored in memory medium 23, and to select a GPS-advice data set 37 from the plurality of GPS-advice data sets 35if the GPS device location it has computed falls within the GPS-advice range 40 contained in each of the of GPS-advice data sets 35. CPU 30 is also programmed to compare a GPS device location that has been input by a user of GPS device 20 with the GPS-advice range 40 contained in each of the GPS-advice data sets 35 stored in memory medium 23, and to select a GPS-advice data set 37 from the plurality of GPS-advice data sets 35, whenever the user-input GPS device location falls within the GPS-advice range 40 contained in each of the GPS-advice data sets 35.

CPU 30 is further programmed to compare one or more GPS-advice types that have been input by a user of GPS device 20 with the GPS-advice type 39 contained each of the GPS-advice data sets 35 stored in memory medium 23, and to select a GPS-advice data set 37 from the plurality of GPS-advice data sets 35, whenever the user-input GPS-advice type matches a GPS-advice type 39 contained in each of the of GPS-advice data sets 35.

Having selected one or more GPS-advice data sets on the basis of any of the foregoing selection modalities, CPU 30 copies the information content 36 of the selected GPS-advice data sets to output device 33 of GPS device 20 for automatic, periodic or on-demand output to the user of GPS device 20. For example, CPU 30 may be programmed to display the information content 36 of the selected GPS-advice data sets output to output device 33 whenever the GPS device location is output to output device 33

As shown schematically in FIG. 3, in a second embodiment of the invention, GPS satellite antenna 34 on GPS satellite 49 receives satellite-bound carrier signal 50 carrying satellite-bound GPS-advice data set 51 transmitted thereto from one or more external transmitters 52.

GPS satellite receiver 47 receives GPS-advice data set 51 from GPS satellite antenna 34 following passage of satellite-bound carrier signal 50 through signal input circuit 48, which identifies, demodulates and extracts satellite-bound GPS-advice data set 51. GPS satellite receiver 47 thereafter stores satellite-bound GPS-advice data set 51 in an allocation of computer memory 53 of the GPS satellite 49.

GPS satellite signal output circuit 46 recovers GPS-advice data set 51 from GPS satellite allocation of computer memory 53 for remodulation as satellite-broadcast GPS-advice data set 45 on dedicated satellite-broadcast carrier signal 55. GPS satellite signal output circuit 46 thereafter multiplexes dedicated satellite-broadcast carrier signal 55 with L1 signals 24 continuously broadcast by GPS satellite transmitter 54.

GPS satellite 49 may be any one of the twenty-four GPS satellites comprising the constellation of orbiting GPS satellites. GPS satellite receiver 47 and GPS satellite signal input circuit 48 in each GPS satellite may be adapted to acquire, identify, demodulate and extract satellite-bound carrier signals 50 carrying different forms, types or kinds of satellite-bound GPS-advice data set 51 transmitted thereto from one or more external transmitters 52.

GPS receiver 21 and signal-processing circuit 26 of GPS device 20 are adapted to acquire, identify, and demodulate dedicated satellite-broadcast carrier signal 55 for extraction of satellite-broadcast GPS-advice data set 44. CPU 30 is programmed to compare the GPS device location computed by it for GPS device 20, or the GPS device location input by a user of GPS device 20, with the GPS-advice range 40 included in extracted satellite-broadcast GPS-advice data set 44, and to copy extracted satellite-broadcast GPS-advice data set 44 to output device 33 of GPS device 20, only if the calculated or user-input GPS device location falls within the GPS-advice range 40 included in the extracted satellite-broadcast GPS-advice data set 44.

CPU 30 is also programmed to compare a GPS-advice type input by a user of GPS device 20 with GPS-advice type 39 included in extracted satellite-broadcast GPS-advice data set 44, and to copy extracted satellite-broadcast GPS-advice data set 44 to output device 33 of GPS device 20, only if the user-input GPS-advice type matches the GPS-advice type 39 included in extracted satellite-broadcast GPS-advice data set 44.

CPU 30 is further programmed to ignore extracted satellite-broadcast GPS-advice data set 44 whenever the computed or user-input GPS device location does not fall within the GPS-advice range 40, or whenever a user-input GPS-advice type does not match the GPS-advice type 39, included in extracted satellite-broadcast GPS-advice data set 44.

Satellite-broadcast GPS-advice data set45, extracted satellite-broadcast GPS-advice data set 44 and GPS-advice data set 37 may be contain advertising.

The foregoing description of embodiments and uses of this invention has been presented for purposes of illustration and description. It is not intended to be exhaustive or to limit the invention to the precise form or use disclosed, and obviously, many modifications and variations are possible. Such modifications and variations that may be apparent to a person skilled in the art are intended to be included within the scope of this invention as defined by the accompanying claims.

The invention claimed is:
1. An apparatus comprising a memory medium storing at least one GPS-advice data set comprising a GPS-advice type, a GPS-advice range and GPS advice;
    wherein the memory medium is operatively connected to a GPS device having a central processing unit and an output device; and
    wherein the central processing unit of the GPS device is configured to compute a current GPS device location for the GPS device, and accept as input from a user of the GPS device, any GPS device location or GPS-advice type.

2. The apparatus of claim 1, wherein the central processing unit of the GPS device compares the computed current, or user-input, GPS device location with the at least one GPS-advice data set, and selects the GPS-advice data set for output to the output device if the GPS device location falls within the GPS-advice range of the GPS-advice data set.

3. The apparatus of claim 1, wherein the central processing unit of the GPS device compares the user-input GPS-advice type with the GPS-advice type of the GPS-advice data set and selects the GPS-advice data set for output to the output device if the user-input GPS-advice type matches the GPS-advice type of the GPS-advice data set.

4. The Apparatus of claim 1, wherein the GPS-advice comprises advertising information referable to the GPS device location.

5. A method for providing information to a GPS device having a central processing unit and an output device, comprising the step of storing at least one GPS-advice data set comprising a GPS-advice type, a GPS-advice range and GPS-advice on a memory medium operatively connected to the GPS device;
    computing, by the central processing unit, a current GPS device location for the GPS device; and
    accepting, by the central processing unit, as input by a user of the GPS device, any GPS device location or GPS-advice type.

6. The method of claim 5, wherein the central processing unit of the GPS device is programmed to compare the computed current, or user-input, GPS device location with the GPS-advice range of the GPS-advice data set, and to select the GPS-advice data set for output to the output device if the GPS device location falls within the GPS-advice range of the GPS-advice data set.

7. The method of claim 5, wherein the central processing unit of the GPS device is programmed to compare the user-input GPS-advice type with the GPS-advice type of the GPS-advice data set, and to select the GPS-advice data set for output to the output device if the user-input GPS-advice type matches the GPS-advice type of the GPS-advice data set.

8. The method of claim 5, wherein the GPS-advice comprises advertising information referable to the GPS device location.

9. A system comprising at least one GPS satellite having an allocation of memory storing at least one GPS-advice data set containing a GPS-advice type, a GPS-advice range and GPS-advice;
    wherein the GPS satellite broadcasts the GPS-advice data set to a GPS device having a central processing unit and an output device; and
    wherein the central processing unit of the GPS device computes a current GPS device location for the GPS device, and accepts as input from a user of the GPS device, any GPS device location or GPS-advice type.

10. The system of claim 9, wherein the central processing unit of the GPS device compares the computed current, or user-input, GPS device location with the GPS-advice range of the broadcast GPS-advice data set, and selects the broadcast GPS-advice data set for output to the output device if the GPS device location falls within the GPS-advice range of the broadcast GPS-advice data set.

11. The system of claim 9, wherein the central processing unit of the GPS device compares a user-input GPS-advice type with the GPS-advice type of the broadcast and received GPS-advice data set, and selects the GPS-advice data set for output to the output device if the user-input GPS-advice type matches the GPS-advice type of the broadcast and received GPS-advice data set.

12. The system of claim 9, wherein the GPS-advice comprises advertising information referable to at least one GPS device location.

13. A method for providing information to a GPS device having a central processing unit and an output device, comprising the steps of:
    storing at least one GPS-advice data set, comprising a GPS-advice type, a GPS-advice range, and GPS-advice in an allocation of memory of at least one GPS satellite;
    broadcasting the GPS-advice data set from the GPS satellite for reception by the GPS device;
    computing, by the central processing device, a current GPS device location; and
    accepting, by the central processing device, as input by a user, any GPS device location or GPS-advice type.

14. The method of claim 13, wherein the central processing unit of the GPS device is programmed to compare the computed current, or user-input, GPS device location with the GPS-advice range of the broadcast and received GPS-advice data set, and to select the GPS-advice data set for output to the output device if the GPS device location falls within the GPS-advice range of the broadcast and received GPS-advice data set.

15. The method of claim 13, wherein the central processing unit of the GPS device is programmed to compare the user-input GPS-advice type with the GPS-advice type of the broadcast and received GPS-advice data set, and to select the broadcast GPS-advice data set for output to the output device if the user-input GPS-advice type matches the GPS-advice type of the broadcast and received GPS-advice data set.

16. The method of claim 13, wherein GPS-advice data comprises advertising information referable to at least one GPS device location.

* * * * *